(12) United States Patent
Kay

(10) Patent No.: US 7,791,731 B2
(45) Date of Patent: Sep. 7, 2010

(54) PARTIAL COHERENCE INTERFEROMETER WITH MEASUREMENT AMBIGUITY RESOLUTION

(75) Inventor: David B. Kay, Rochester, NY (US)

(73) Assignee: Quality Vision International, Inc., Rochester, NY (US)

(*) Notice: Subject to any disclaimer, the term of this patent is extended or adjusted under 35 U.S.C. 154(b) by 384 days.

(21) Appl. No.: 11/958,411

(22) Filed: Dec. 18, 2007

(65) Prior Publication Data

US 2009/0153839 A1 Jun. 18, 2009

(51) Int. Cl.
*G01B 9/02* (2006.01)
(52) U.S. Cl. ...................................... 356/450
(58) Field of Classification Search ................ 356/450, 356/451, 456
See application file for complete search history.

(56) References Cited

U.S. PATENT DOCUMENTS

| | | | |
|---|---|---|---|
| 4,309,108 A | 1/1982 | Seibert | |
| 4,595,829 A | 6/1986 | Neumann et al. | |
| 5,263,776 A | 11/1993 | Abraham et al. | |
| 5,886,786 A | 3/1999 | Kanaya et al. | |
| 5,953,137 A | 9/1999 | Sirat et al. | |
| 5,995,222 A | 11/1999 | Kanaya et al. | |
| 6,195,168 B1 | 2/2001 | DeLega et al. | |
| 6,288,786 B1 | 9/2001 | Rudd et al. | |
| 6,518,996 B1 | 2/2003 | Polidor et al. | |
| 6,781,699 B2 | 8/2004 | Dunn et al. | |
| 7,075,660 B2 | 7/2006 | Farmiga et al. | |
| 7,633,623 B2 * | 12/2009 | Hatori ........................ | 356/450 |
| 2003/0234936 A1 | 12/2003 | Marron | |
| 2005/0195310 A1* | 9/2005 | Yajima et al. .............. | 348/345 |
| 2007/0258709 A1 | 11/2007 | Gesner | |

FOREIGN PATENT DOCUMENTS

| | | |
|---|---|---|
| JP | S60-88210 U | 6/1985 |
| JP | H08-114413 A | 5/1996 |
| JP | H09-184705 A | 7/1997 |

OTHER PUBLICATIONS

Davidson et al., "An application of interference microscopy to integrated circuit inspection and metrology", Proc. Soc. Photo-Opt., Instrum. Eng. 775, pp. 233-247 (1987).
Smith et al., "Absolute displacement measurements using modulation of the spectrum of white light in a Michelson interferometer", Applied Optics, vol. 28, No. 15 pp. 3339-3342 (1989).
Handbook of Optical Coherence Tomography, Marcel Dekker, Inc. (2002).

(Continued)

*Primary Examiner*—Michael A Lyons
(74) *Attorney, Agent, or Firm*—Stephen B. Salai, Esq.; Thomas B. Ryan; Harter Secrest & Emery

(57) ABSTRACT

A partial coherence interferometer incorporates a focusing system for resolving measurement ambiguities. A focus-sensing beam is directed through a common objective with the measurement beam of the interferometer for conveying the beams to and from a test surface. An unambiguous measuring range is equated to a predetermined range of focusing errors.

20 Claims, 3 Drawing Sheets

OTHER PUBLICATIONS

Huang et al., "Optical Coherence Tomography", Science, vol. 254, pp. 1178-1181 (1991).

Dresel et al., "Three-dimensional sensing of rough surfaces by coherence radar", Applied Optics, vol. 31, No. 7, pp. 919-925 (1992).

Kay et al., "Heads and Lasers", Handbook of Magneto-Optical Data Recording, Noyles Publications pp. 100-102 (1997).

Dorsch et al., "Laser triangulation: fundamental uncertainty in distance measurement", Applied Optics, vol. 33, No. 7, Mar. 1, 1994.

International Search Report for related application No. PCT/US2008/068602.

Summarized English Translation of JP Office Action for JP2009-546588, which is related through priority to the subject application, Dec. 22, 2009.

* cited by examiner

PARTIAL COHERENCE INTERFEROMETER WITH MEASUREMENT AMBIGUITY RESOLUTION

FIELD OF THE INVENTION

The invention relates to the field of partial coherence interferometry and to the resolution of ambiguities associated with interference measurements spanning a null condition.

BACKGROUND OF THE INVENTION

Partial coherence interferometers measure distances by monitoring interference as a function of wavelength. A measuring beam, which has a spectral bandwidth spanning a range of wavelengths, is temporarily split into a test beam and a reference beam. The test beam propagates along a test arm encountering a test surface en route to a detector. The reference beam propagates along a reference arm encountering a reference surface en route to the same detector. Height variations between different points on the test surface produce corresponding changes in the optical path length of the test arm.

The detector separates the combined test and reference beams into their common spectral components and detects varying intensities associated with the interference for each sampled wavelength. The interference as a function of wavelength is related to optical path length differences between the test and reference beams. A so-called "null condition" occurs when the optical path lengths of the test and reference arms are equal. The period of the interference maximums and minimums increases on opposite sides of the null condition independently of whether the test arm is longer than the reference arm or the reference arm is longer than the test arm.

Thus, partial coherence interferometers are generally arranged to avoid the null condition, but if operating in the vicinity of the null condition, the partial coherence interferometers must also be arranged to distinguish between optical path lengths of the test arm that are longer than or shorter than the optical path length of the reference arm. Range sensors, particularly triangulation range sensors, have been used for identifying limited ranges of unambiguous measurements. However, these range sensors are generally inadequate for covering larger ranges of measurement with high resolution and are more disturbed by irregular surfaces including surfaces with tool marks or other artifacts of roughness, i.e., surfaces having peak to valley roughness of at least ⅛ wavelength of the measuring beam.

SUMMARY OF THE INVENTION

The invention contemplates a partial coherence interferometer having a range of measurement, e.g., approximately one millimeter, for measuring test object surface profiles. A focus sensor operable over an even longer range of measurement, e.g., 3 to 5 millimeters, references the measurements to a null condition of the interferometer for distinguishing measurements within an unambiguous range from other measurements approaching the null condition or extending to the other side of the null condition. The measurements can be made with low beam shadowing and over large working distances for measuring test object surfaces with varying reflectivities, e.g., from 100% to less than 1%, including specular through diffuse reflections.

A proposed range sensor system, which includes the focus sensor, shares a portion of a test arm of the partial coherence interferometer for directing light to and from the test object surface through a common objective lens. Preferably, the objective lens has a low numerical aperture in the range of 0.1 for supporting a large working distance. The focus sensor system can share a portion of the measuring beam or can supply its own sensor beam, particularly for operating within a different range of wavelengths.

By obscuring about half of the focus sensor beam at the focus of the sensor lens, changes in the axial position of the test surface encountered by the focus sensor beam are converted into detectable lateral displacements of the light distribution returning to the focus detector. The null condition of the interferometer can be calibrated with these lateral displacements of the light distribution, so that a predetermined range of lateral displacements corresponds to a range of measurements offset from one side of the null condition. The focal position of the interferometer through the objective lens is preferably set at an optical path length difference between the test and reference arms equal to approximately 60 percent of the overall measurement range (e.g., 0.60×1 mm=0.6 mm). Thus, at one end of the measurement range closest to the null condition, the test object surface remains offset from the null condition by a predetermined amount (e.g., 0.1 mm). Measurements corresponding to axial displacements from the focal position beyond the minimum offset from the null condition are accepted for measurement, while measurements corresponding to other axial displacements closer to or on the other side of the null condition are excluded or resolved as measurements of opposite sign. This is needed since partial coherence measurements are not accurate near the null condition.

One version of the invention as a partial coherence interferometer employs a measuring beam having a given spectral bandwidth. A test arm conveys a test beam portion of the measuring beam along a pathway encountering a test surface, and a reference arm conveys a reference beam portion of the measuring beam along a pathway encountering a reference surface. The test arm includes a focusing optic for focusing the test beam onto the test surface and for collecting a reflected portion of the test beam from the test surface. A spectrally sensitive detector system coupled to the test and reference arms monitors interference as a function of wavelength throughout a range of the measuring beam bandwidth as a measure of unsigned optical path length differences between the test and reference arms. A focus detector system calibrated with the interferometer distinguishes optical path length differences between the test and reference arms that are greater than zero or less than zero for resolving ambiguities associated with the measure of unsigned optical path length differences between the test and reference arms.

The focus detector system preferably includes a focus arm that conveys light reflected from the test surface through the focusing optic to a focus detector. In addition, the focus detector system preferably distinguishes positions of the test surface at which the optical path length differences between the test and reference arms are greater than zero from positions of the test surface at which the optical path length differences between the test and reference arms are less than zero. The focus detector system also preferably distinguishes between optical path length differences approaching zero from the optical path length differences of one sign or the other that are significantly greater than or less than zero.

A processor preferably receives (a) measures from the spectrally sensitive detector system related to unsigned optical path length differences between the test and reference arms and (b) indications from the focus detector system of whether the test surface is in a position at which the optical path length differences between the test and reference arms are greater than or less than zero. The light reflected from the test surface through the focusing optic to a focus detector can be a portion of the measuring beam. Alternatively, the interferometer can further comprise a first light source for producing the measuring beam and a second light source for producing a focus-sensing beam conveyed by the focus arm through the focusing optic to and from the test surface to the focus detector. Preferably, a nominal wavelength of at least one of the focus-sensing beam and the measuring beam is within a visible band of wavelengths so that a visible spot is presented at the test surface.

The focus detector system can be calibrated with the interferometer by positioning the focus of the light passing through the focusing optic at a predetermined offset from a null condition at which the optical path length of the test arm equals the optical path length of the reference arm. Preferably, the predetermined offset is at least one-half of a predetermined measuring range of the interferometer.

Another version of the invention is a method of resolving a measurement ambiguity of partial coherence interferometric measurements based on unsigned optical path length differences between test and reference beams. A measuring beam, which has a given spectral bandwidth, is divided into a test beam propagating along a test arm and a reference beam propagating along a reference arm. The test beam is directed along the test arm through a focusing optic to and from a test surface. Upon recombining the test and reference beams, interference is monitored over a range of wavelengths of the recombined beams as a measure of unsigned optical path length differences between the test and reference arms. Light reflected from the test surface is also conveyed through the focusing optic to a focus detector for measuring focusing errors. The measured focusing errors distinguish optical path lengths of the test and reference arms that are significantly shorter than or significantly longer than one another.

A focus of the focusing optic is preferably located in a position offset from a null condition at which the optical path lengths of the test and reference arms are equal. The positions of the test surface at which the optical path length differences between the test and reference arms are significantly greater than zero are distinguished from positions of the test surface at which the optical path length differences between the test and reference arms are significantly less than zero. In doing so, optical path length differences approaching zero are preferably distinguished from the optical path length differences of one sign or the other that are significantly greater than or less than zero.

A range of the focusing errors is preferably correlated to a range of optical path length differences between the test and reference arms at which the optical path length of the test arm is either significantly longer than or significantly shorter than the optical path length of the reference arm. The monitored interference measures of optical path length differences between the test and reference arms are selected based on their association with the identified range of focusing errors.

BRIEF DESCRIPTION OF THE DRAWING FIGURES

DETAILED DESCRIPTION OF THE INVENTION

Figure 1:
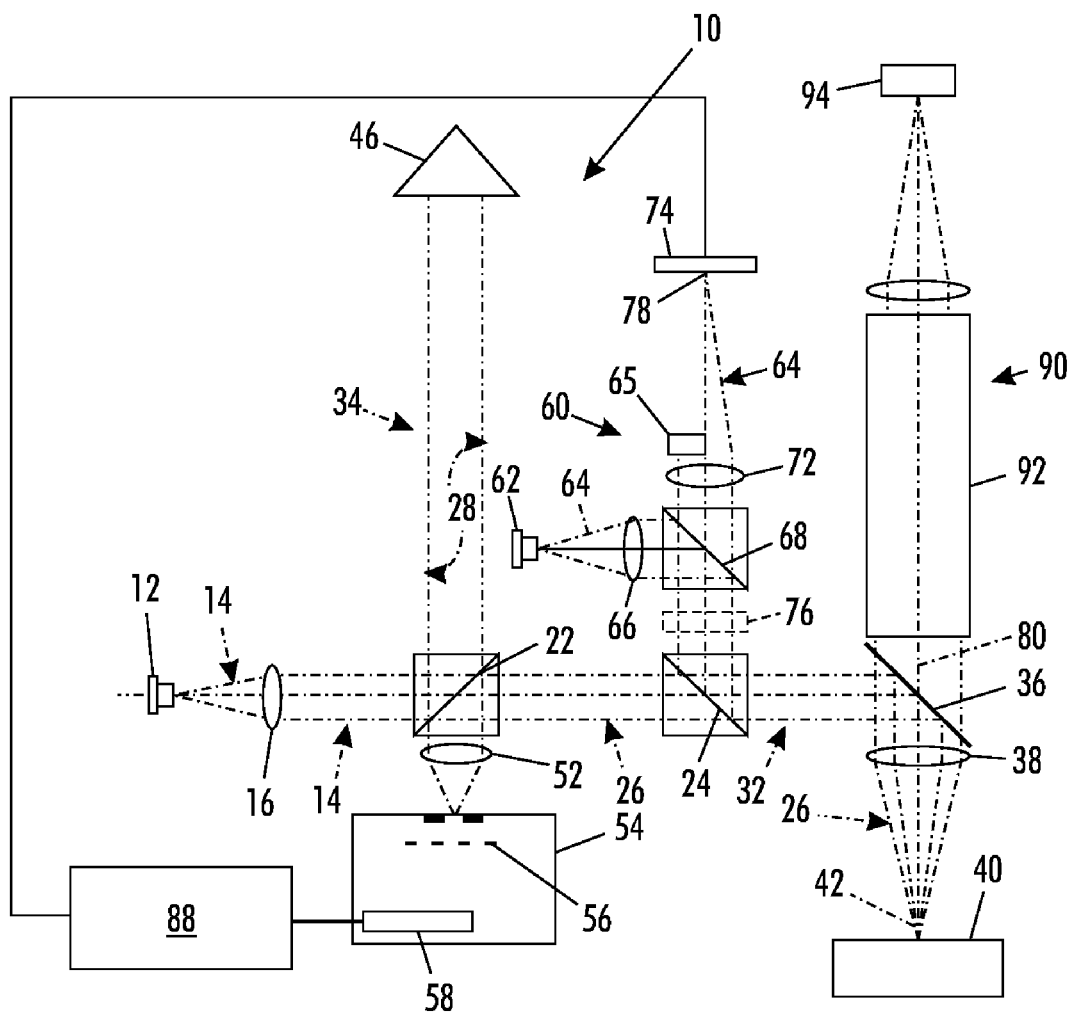
FIG. 1 is a diagram of a partial coherence interferometer including a focus detector system with a separate light source.

A partial coherence interferometer 10, as shown in FIG. 1, includes a light source 12 for generating a measuring beam 14 having given spectral bandwidth, preferably within the visible or infrared spectrum. The light source 12 is preferably a broadband light source, such as a superluminescent diode, having power output of approximately 10 milliwatts and a spectral bandwidth of approximately 40 nanometers of wavelength, usually within a range between 10 nanometers and 150 nanometers of bandwidth at a nominal wavelength of approximately 800 nanometers. As such, the light source 12 can also be referred to as a low temporal coherence source. A collimating lens 16 collimates an expanded measuring beam 14 for propagation through the interferometer 10.

A 50/50 beamsplitter 22 divides the measuring beam 14 into a test beam 26 and a reference beam 28. The test beam 26 transmits through the 50/50 beamsplitter 22 for propagating along a test arm 32 of the interferometer 10. The reference beam 28 reflects from the 50/50 beamsplitter 22 for propagating along a reference arm 34 of the interferometer 10.

The test beam 26 transmits though a first wavelength-sensitive dichroic beamsplitter 24 and reflects from a second wavelength-sensitive dichroic beamsplitter 36 through an objective lens 38, which converges the test beam 26 toward a point of focus 42 on or at least near a test object surface 40. The same objective lens 38 collects light reflected by specular, diffuse, or some combination of specular and diffuse reflection from the test object surface 40 for directing the test beam 26 on a return path past the two dichroic beamsplitters 36 and 24 back to the 50/50 beamsplitter 22. Preferably, the objective lens 38 has a numerical aperture of approximately 0.1, resulting in working distance of around, for example, 70 millimeters and a preferred measurement range of around 1.0 millimeter.

Portions of the returning test and reference beams 26 and 28 are recombined by the 50/50 beamsplitter 22 for propagation together through a focusing optic 52 en route to a spectrally sensitive detector system 54. That is, the 50/50 beamsplitter 22 reflects a portion of the returning test beam 26 and transmits a portion of the returning reference beam 28 in a common direction through the focusing optic 52. The spectrally sensitive detector system 54 is preferably a spectrometer combining a diffraction grating 56 for angularly separating the different wavelengths of the measuring beam (i.e., the recombined test and reference beams 26 and 28) and a linear CCD (charge coupled device) sensor array 58 for measuring the respective interference intensities of the spatially separated wavelengths.

To avoid measurement ambiguities associated with optical path length differences straddling or even approaching the null condition, a focusing system 60 is coupled to the interferometer 10 through the first dichroic beamsplitter 24. A separate light source 62, such as a laser diode preferably operating within the visible spectrum (e.g., at 650 nanometers wavelength), generates a focus-sensing beam 64 that is collimated in an expanded form by a collimating lens 66 for propagation as a parallel beam through the remaining focusing system 60 and the interferometer 10. A beamsplitter 68, which can be arranged as a partially reflecting or polarization-sensitive beamsplitter, reflects the collimated focus-sensing beam 64 along a pathway to the dichroic beamsplitter 24. The wavelength sensitivity of the dichroic beamsplitter 24 results in the reflection of the focus-sensing beam 64 along a pathway in common with the test beam 26 en route through the objective lens 38 to and from the test surface 40.

A portion of the focus-sensing beam 64 reflected from the test surface 40 is returned through the dichroic beamsplitter 24 to the beamsplitter 68 for further propagation through focus detector optics 72 to a focus detector 74. A quarter-wave plate 76 can be used in conjunction with the beamsplitter 68 arranged as a polarizing beamsplitter to rotate polarization of the focus-sensing beam 64 to more efficiently direct the returning focus-sensing beam 64 to the focus detector 74. Alternately, a less expensive, but less light efficient 50/50 beamsplitter could be used for 68, and no quarter-wave plate would then be needed.

The focus detector optics 72 preferably form a conjugate image 78 of the point of focus 42 of the objective lens 38 on the focus detector 74, prior to setting the aforementioned offset stop 65 that blocks substantially one-half of the transverse area of the focus-sensing beam 64. The light distribution shifts between two photodetectors within an image plane of the focus detector 74 with changes in the axial position of the test object surface 40 along an optical axis 80 of the objective lens 38.

Figure 2A:
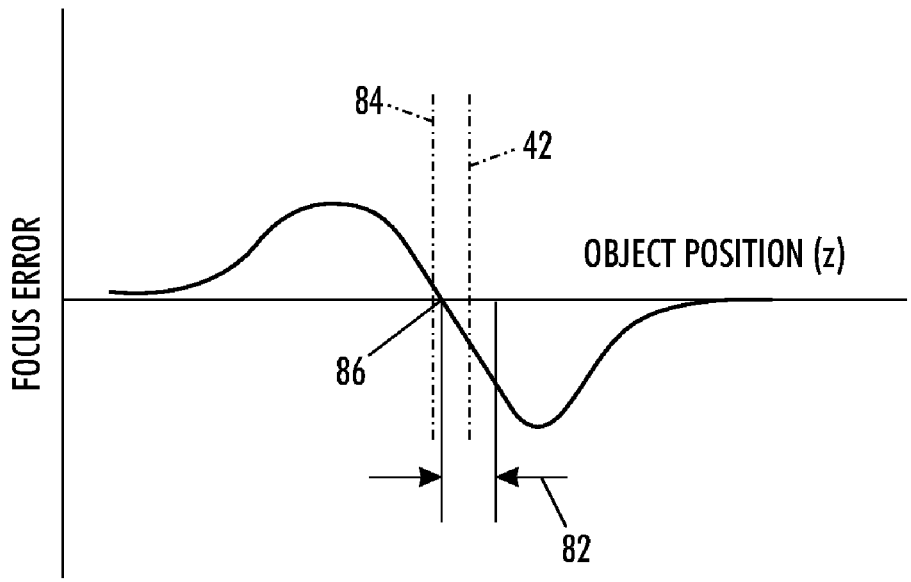
FIG. 2A is a plot showing first relationship of a null condition of the interferometer to a range of focusing error.
Figure 2B:
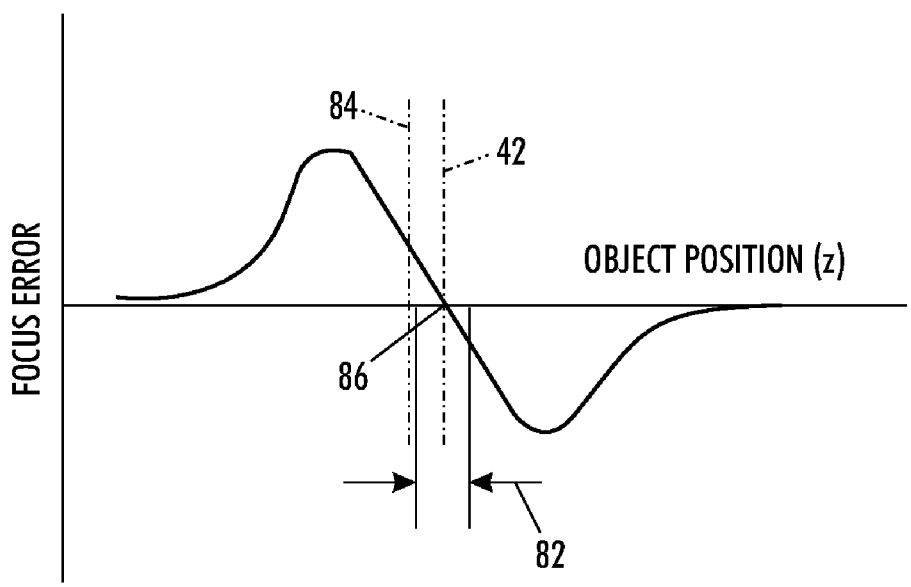
FIG. 2B is a plot showing first relationship of a null condition of the interferometer to a range of focusing error.

FIGS. 2A and 2B plot a range of focus errors over a domain of possible positions of the test surface 40 along the optical axis as a relationship between the difference and sum of the photodetector outputs as follows:

$$\text{Focus Error} = \frac{A - B}{A + B}$$

where "A" and "B" are the respective outputs of two photodetectors in the image plane of the focus detector 74.

In both FIGS. 2A and 2B, the point of focus 42 of the test beam and focus sensor beam are located midway of an intended measurement region 82, and the null condition 84 of the interferometer 10 is displaced just beyond one end of the measurement region 82. For example, the reference arm 34 can be arranged to have an optical path length that is greater than or less than the optical path length of the test arm 32 by approximately 60% of the length of the intended measurement region 82. With the intended measurement region 82 centered about the focal point 42, the null condition 84 is outside the intended measurement region 82 by an offset equal to approximately 10 percent of the length of the intended measurement region 82. Thus, if the measurement region spans 1.0 millimeter of travel, the focal point 42 is displaced by 0.6 millimeter from the null condition 84, and the null condition 84 is offset from the measurement region 82 by 0.1 millimeter.

In FIG. 2A, one end of the measurement region is located at a crossing point 86 where A equals B, and achieved by an offset of the detector's 74 position, so that focus error associated with the intended measurement region 82 has a value between zero and a given negative value. The null condition 84 and other positions of the test surface 40 within the positive range of the focus error are excluded from the domain of the measurement region 82. In FIG. 2B, the point of focus 42 is located at the crossing point 86 of the focus error where A equals B. The domain of the measurement region 82 is delimited by an absolute value of the focus error signal.

An astigmatic focus sensor also suitable for these purposes is discussed in the Handbook of Magneto-Optical Data Recording, Noyes Publications (1997) on pp. 100-102. The astigmatic focus detector uses a quadrant detector with output signals A, B, C, and D. The normalized focus error signal from this detector is given as:

$$\text{Focus Error} = \frac{(A + C) - (B + D)}{A + B + C + D}$$

where "A", "B", "C", and "D" are photodetector signals from each or four quadrants of the focus sensor image plane. Focus error curves similar to those shown in FIG. 2A and FIG. 2B can also be obtained.

A processor 88 receives information from both the spectrally sensitive detector system 54 and the focus detector 74. From the spectrally sensitive detector system 54, the processor receives information related to the intensity fluctuations of the recombined test and reference beams 26 and 28 over a range of wavelengths for calculating the optical path differences between the test and reference arms 32 and 34 associated with the axial position of the point of focus 42 on the test object surface 40.

From the focus detector, the processor 88 receives information relating to the focusing error, which corresponds to the axially displaced position of the test surface 40 in relation to the point of focus 42. A range of focusing errors is associated with the intended measurement region 82. For example, either the polarity or the magnitude or a combination of both the polarity and the magnitude of the focusing error can be used to distinguish the intended measurement region 82. Measures of optical path length associated with focusing errors within the intended measurement region 82 are retained (i.e., selected as valid data), and measures of optical path length associated with focusing errors outside the intended measurement region 82 are preferably discarded. Thus, only unambiguous measures of optical path length differences are retained.

Although not shown, the test object surface 40 is preferably supported on a coordinate measuring stage that relatively translates or rotates the test surface 40 with respect to the point of focus 42 for measuring other points on the test object surface 40 with respect to a range of datum positions. For example, the coordinate measuring stage can supply spatial information concerning changes in position along two coordinate axes (e.g., X and Y coordinate axes) and the interferometer 10 can provide information concerning changes in position along a third coordinate axis (e.g., the Z coordinate axis) aligned with the optical axis 80. Generally, the interferometer collects information concerning height variations of the test surface 40. Individual measurements are preferably taken at a rate of a few hundred to approximately 1000 measurements per second for defining all or a predetermined portion of the test surface 40 as an array of measured points.

A video imaging system 90 is coupled through the dichroic beamsplitter 36 for imaging the test surface 40 during both the setup and measurement of the test object surface 40. An optional zoom lens 92 relays an adjustable size image of the test surface 40 onto a video CCD detector array 94. The focusing system 60, which preferably operates within the visible spectrum, can be used to produce a visible target spot on the test surface 40 for referencing measureable points on the test surface 40 with respect to visible features or boundaries of the test surface 40.

Figure 3:
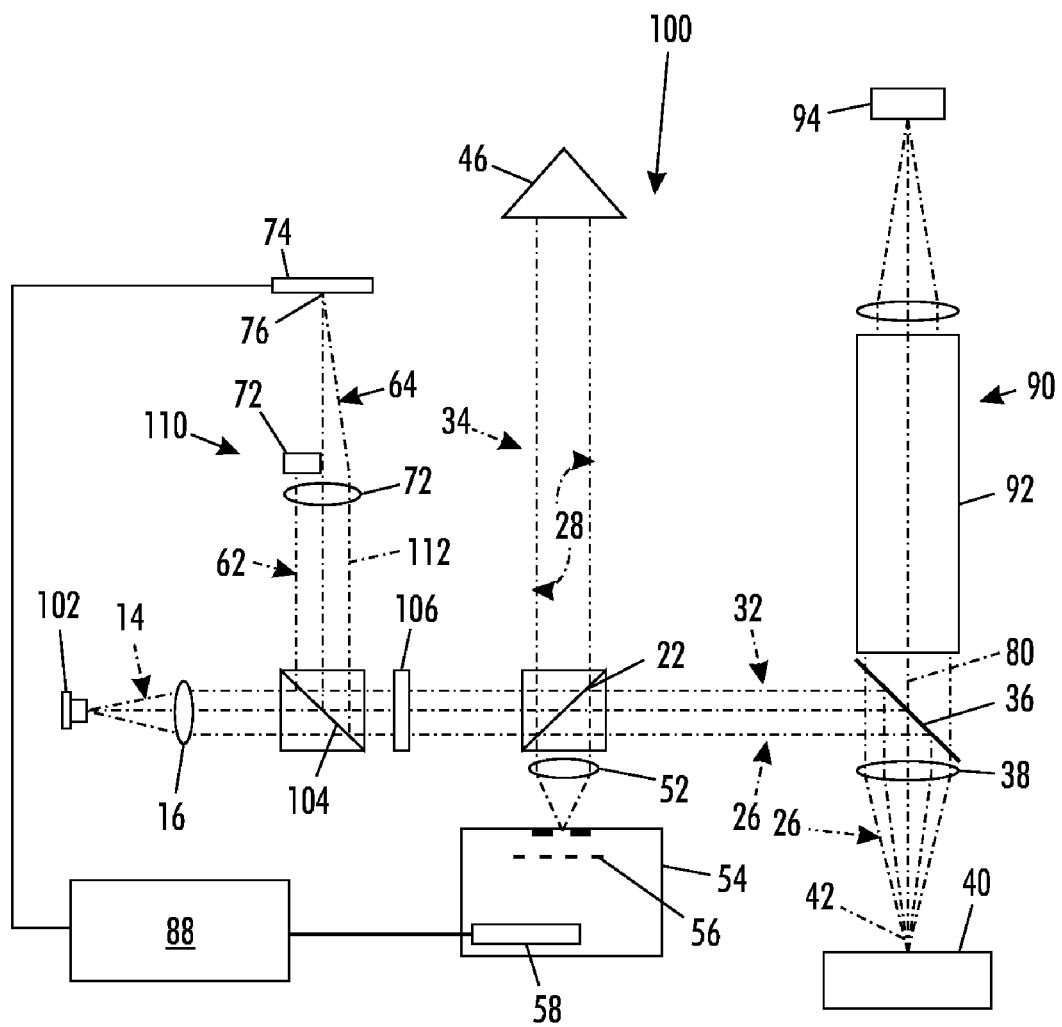
FIG. 3 is a diagram of a partial coherence interferometer including a focus detector system sharing a light source.

An alternative partial coherence interferometer 100 is shown in FIG. 3 with corresponding features sharing reference numerals with their counterparts in the partial coherence interferometer 10 shown in FIG. 1. However, in contrast to the interferometer 10, a common light source 102 optically powers both the interferometer 100 and an interrelated focusing system 110, which light source 102 is preferably a superluminescent diode operating within the visible spectrum (e.g., approximately 680 nanometers wavelength). By operating within a visible spectrum, a measurement spot appears on the test surface 40 at the point of focus 42 for setting up and referencing the measuring points to visible features or boundaries of the test surface 40.

Since superluminescent diodes are partially polarized, the focusing system 110 can be coupled to the interferometer 100 through a polarization beamsplitter 104. A quarter-wave plate 106 is used in connection with the polarization beamsplitter 104 so that the returning measuring beam 14 is reflected along a focusing arm 112 of the focusing system 110 as the focus-sensing beam 64. In addition to increasing efficiency, the polarization beamsplitter 104 reduces feedback to the light source 102. Although sharing a common light source 102, both the interferometer 100 and the focusing system 110 operate similar to their counterparts of preceding embodiment A partially reflective, partially transmissive beamsplitter could also be used in place of the polarization beamsplitter 104. Preferably, the alternative beamsplitter favors transmissions to preserve more power of the initial measuring beam 14 while sacrificing some power of the focus-sensing beam 64, which is collected to the focus detector 74.

The embodiments of FIGS. 1 and 3 show collimated test and or focus-sensing beams 26 and or 64, or 14, entering the shared objective lens 38. If the shared objective lens 38 were to be part of a finite conjugate video imaging system (i.e. not infinity corrected and therefore requiring a diverging beam incident on the dichroic beamsplitter 36), those skilled in the art of optical design could add appropriate lens elements between the polarization beamsplitter 24 (in FIG. 1) and the 50/50 beamsplitter 22 (in FIG. 3) and the dichroic beamsplitter 36 or elsewhere to join the two optical systems.

Although at least one of the measurement and focus-sensing beams is within the visible spectrum so a measurement spot appears on the test surface, either or both beam could also be used within a non-visible range, such as the infrared range for performing their primary functions. The partial coherence interferometer 10 can be housed together with the focusing system 60 to make a standalone sensor or the components could be separately housed or modularized. Although the partial coherence interferometers of FIGS. 1 and 3 are arranged as Michelson interferometers, the interferometers could also take other known interferometric forms.

The embodiments are presented are examples of how the invention can be carried out. Those of skill in the art will recognize modifications, substitutions, and other changes that can be made in accordance with the invention to accommodate a range of different applications.

The invention claimed is:

1. A partial coherence interferometer of a type that employs a measuring beam having a given spectral bandwidth comprising
    a test arm for conveying a test beam portion of the measuring beam along a pathway encountering a test surface,
    a reference arm for conveying a reference beam portion of the measuring beam along a pathway encountering a reference surface,
    the test arm including a focusing optic for focusing the test beam onto the test surface and for collecting a reflected portion of the test beam from the test surface,
    a spectrally sensitive detector system coupled to the test and reference arms that monitors interference as a function of wavelength throughout a range of the measuring beam spectral bandwidth as a measure of unsigned optical path length differences between the test and reference arms,
    a focus detector system calibrated with the interferometer for distinguishing optical path length differences between the test and reference arms that are significantly greater than zero from optical path length differences between the test and reference arms that are significantly less than zero for resolving ambiguities associated with the measure of unsigned optical path length differences between the test and reference arms,
    the focus detector system including a focus arm that conveys light reflected from the test surface through the focusing optic to a focus detector, and
    the focus detector system being calibrated with the interferometer by positioning the focus of the light passing through the focusing optic at a predetermined offset from a null condition at which the optical path length of the test arm equals the optical path length of the reference arm.

2. The interferometer of claim 1 in which the focus detector system distinguishes positions of the test surface at which the optical path length differences between the test and reference arms are significantly greater than zero from positions of the test surface at which the optical path length differences between the test and reference arms are significantly less than zero.

3. The interferometer of claim 2 in which the focus detector system also preferably distinguishes between optical path length differences approaching zero from the optical path length differences of one sign or the other that are significantly greater than or less than zero.

4. The interferometer of claim 2 further comprising a processor that receives (a) measures from the spectrally sensitive detector system related to unsigned optical path length differences between the test and reference arms and (b) indications from the focus detector system of whether the test surface is in a position at which the optical path length differences between the test and reference arms are greater than or less than zero.

5. The interferometer of claim 2 in which the light reflected from the test surface through the focusing optic to a focus detector is a portion of the measuring beam.

6. The interferometer of claim 2 further comprising a first light source for producing the measuring beam and a second light source for producing a focus-sensing beam conveyed by the focus arm through the focusing optic to and from the test surface to the focus detector.

7. The interferometer of claim 6 in which a nominal wavelength of the focus-sensing beam is within a visible band of wavelengths and a nominal wavelength of the measuring beam is within an invisible band of wavelengths.

8. The interferometer of claim 1 in which the interferometer has a predetermined measuring range and the predetermined offset is at least one-half of the predetermined measuring range of the interferometer.

9. A partial coherence interferometer that measures optical path length differences traversed by test and reference beam portions of a measuring beam by monitoring interference variation over a range of wavelengths of the combined beams comprising:
    test and reference arms for conveying the test and reference beam portions of the measuring beam from a light source,
    the test arm including a focusing optic for focusing the test beam onto the test surface and for collecting a reflected portion of the test beam from the test surface, a focus detector system including a focus arm that conveys light reflected from the test surface through the focusing optic to a focus detector, a focus of the focusing optic being related to a given optical path length difference between the test and reference arms so that the focus detector system can distinguish between optical path lengths of the test arm that are significantly shorter than or longer than the optical path length of the reference arm, and the focus of the focusing optic being offset from a null condition at which the optical path lengths of the test and reference arms are equal.

10. The interferometer of claim 9 in which the focus detector system identifies a range of focusing errors corresponding to a range of optical path length differences between the test and reference arms at which the optical path length of the test arm is either significantly longer than or significantly shorter than the optical path length of the reference arm.

11. The interferometer of claim 10 in which the identified range of optical path length differences between the test and reference arms excludes optical path lengths approaching the null condition at which the optical path lengths of the test and reference arms are equal.

12. The interferometer of claim 11 further comprising a processor arranged to select the monitored interference measures of optical path length differences between the test and reference arms associated with the identified range of focusing errors.

13. The interferometer of claim 9 in which the light reflected from the test surface through the focusing optic to a focus detector is a portion of the test beam from the light source.

14. The interferometer of claim 9 in which the light source for producing the measuring beam is a first of two light sources, and a second of the light sources produces a focus-sensing beam conveyed by the focus arm through the focusing optic to and from the test surface to the focus detector.

15. The interferometer of claim 14 in which a nominal wavelength of the focus-sensing beam is within a visible band of wavelengths and a nominal wavelength of the measuring beam is within an invisible band of wavelengths.

16. A method of resolving a measurement ambiguity of partial coherence interferometric measurements based on unsigned optical path length differences between test and reference beams comprising steps of generating a measuring beam having a given spectral bandwidth, dividing the measuring beam into a test beam propagating along a test arm and a reference beam propagating along a reference arm, directing the test beam along the test arm through a focusing optic to and from a test surface, recombining the test and reference beams, monitoring rates of interference variation over a range of wavelengths of the recombined test and reference beams as a measure of unsigned optical path length differences between the test and reference arms, conveying light reflected from the test surface through the focusing optic to a focus detector for measuring focusing errors, locating a focus of the focusing optic in a position offset from a null condition at which the optical path lengths of the test and reference arms are equal, and distinguishing between optical path lengths of the test arm that are significantly shorter than or significantly longer than the optical path length of the reference arm based on the measured focusing errors.

17. The method of claim 16 in which the step of distinguishing includes distinguishing between positions of the test surface at which the optical path length differences between the test and reference arms are significantly greater than zero from positions of the test surface at which the optical path length differences between the test and reference arms are significantly less than zero.

18. The method of claim 17 in which the step of distinguishing includes distinguishing between optical path length differences approaching zero from the optical path length differences of one sign or the other that are significantly greater than or less than zero.

19. The method of claim 16 including a step of identifying a range of the focusing errors corresponding to a range of optical path length differences between the test and reference arms at which the optical path length of the test arm is either significantly longer than or significantly shorter than the optical path length of the reference arm.

20. The method of claim 19 including a step of selecting the monitored interference measures of optical path length differences between the test and reference arms associated with the identified range of focusing errors.

* * * * *